US010433362B2

United States Patent
Fisher et al.

(10) Patent No.: US 10,433,362 B2
(45) Date of Patent: Oct. 1, 2019

(54) COMPUTER SYSTEM TO CONTINUOUSLY MAINTAIN A USER SESSION WHEN A DISPLAY DEVICE IS MECHANICALLY CONNECTED AND DISCONNECTED

(71) Applicant: Hewlett-Packard Development Company, L.P., Houston, TX (US)

(72) Inventors: Tom Fisher, Carbondale, CO (US); Derek Lukasik, III, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/544,722

(22) PCT Filed: Jan. 30, 2015

(86) PCT No.: PCT/US2015/013843
§ 371 (c)(1),
(2) Date: Jul. 19, 2017

(87) PCT Pub. No.: WO2016/122616
PCT Pub. Date: Aug. 4, 2016

(65) Prior Publication Data
US 2017/0372676 A1 Dec. 28, 2017

(51) Int. Cl.
*G06F 1/16* (2006.01)
*G06F 1/32* (2006.01)
(Continued)

(52) U.S. Cl.
CPC .......... *H04W 76/20* (2018.02); *G06F 1/1626* (2013.01); *G06F 1/1632* (2013.01);
(Continued)

(58) Field of Classification Search
None
See application file for complete search history.

(56) References Cited

U.S. PATENT DOCUMENTS 8,874,284 B2 * 10/2014 Sanders-Reed ........... G06F 3/14
340/971
2003/0112585 A1 6/2003 Silvester
(Continued)

FOREIGN PATENT DOCUMENTS

CN 103116419 5/2013
EP 1355221 A2 10/2003
(Continued)

OTHER PUBLICATIONS

"Advantages and Implementation of HP Remote Graphics Software," May 2007, Hewlett-Packard Development Company, L.P., pp. 1-10, h20331.www2.hp.com/Hpsub/downloads/hp_remotegraphics.pdf.*

(Continued)

*Primary Examiner* — Joni Richer
(74) *Attorney, Agent, or Firm* — HP Inc, Patent Dept.

(57) ABSTRACT

A computer system to continuously maintain a user session when a display device is mechanically connected and disconnected with a base processing device is described. The computer system allows the user to run applications during the user session on the base processing device and use the display device as a monitor. The display device can be detached from the base processing device, and the base processing device can continue running the applications for the user session. In this mode, the separated display device can be used as a tablet form factor computing device which can accept user input and send the user input to the base processing device. Among other functions, the base processing device can operate with the display device disconnected by generating session content for the display device, including, for example, sending application content, video streams, and other content to the display device.

20 Claims, 6 Drawing Sheets

(51) Int. Cl.
*H04W 76/20* (2018.01)
*G06F 1/3215* (2019.01)
*G09G 5/00* (2006.01)
*H04W 76/10* (2018.01)
*H04L 29/08* (2006.01)
*H04W 12/06* (2009.01)

(52) U.S. Cl.
CPC .......... *G06F 1/1654* (2013.01); *G06F 1/1698* (2013.01); *G06F 1/3215* (2013.01); *G09G 5/006* (2013.01); *G09G 2340/0407* (2013.01); *G09G 2350/00* (2013.01); *G09G 2354/00* (2013.01); *G09G 2370/16* (2013.01); *G09G 2370/22* (2013.01); *H04L 67/148* (2013.01); *H04W 12/06* (2013.01); *H04W 76/10* (2018.02)

(56) References Cited

U.S. PATENT DOCUMENTS

| | | |
|---|---|---|
| 2003/0198008 A1 | 10/2003 | Leapman et al. |
| 2006/0061951 A1* | 3/2006 | Hara ................... G06F 1/1601 361/679.22 |
| 2010/0011012 A1 | 1/2010 | Rawson |
| 2011/0320405 A1 | 12/2011 | Hsu et al. |
| 2012/0072620 A1 | 3/2012 | Jeong et al. |
| 2012/0081353 A1 | 4/2012 | Yusupov et al. |
| 2012/0166676 A1 | 6/2012 | Roper et al. |
| 2012/0166679 A1 | 6/2012 | Zawacki et al. |
| 2012/0166851 A1* | 6/2012 | Davis ................... G06F 1/1616 713/324 |
| 2012/0243149 A1 | 9/2012 | Gartrell et al. |
| 2013/0084796 A1* | 4/2013 | Kerr ................... G06F 1/1616 455/39 |
| 2014/0184904 A1 | 7/2014 | Lam et al. |
| 2014/0344704 A1 | 11/2014 | Huang et al. |
| 2016/0085960 A1* | 3/2016 | Priev ................... G06F 21/44 726/7 |

FOREIGN PATENT DOCUMENTS

| | | |
|---|---|---|
| WO | WO-2010087829 | 8/2010 |
| WO | WO-20120231522 | 2/2012 |

OTHER PUBLICATIONS

Claire Vanner, "ASUS Releases New Tablet and Ultrabook Range," Sep. 6, 2013, pp. 1-2, CBR.

John Callaham, "Windows 10 'Continuum' Mode for Hybrid Notebook-Tablet Devices Shown in Video," Sep. 30, 2014, pp. 1-24, Mobile Nations.

PCT International Search Report and Written Opinion, Application No. PCT/US2015/013843, dated Oct. 29, 2015, 14 pages.

* cited by examiner

COMPUTER SYSTEM TO CONTINUOUSLY MAINTAIN A USER SESSION WHEN A DISPLAY DEVICE IS MECHANICALLY CONNECTED AND DISCONNECTED

BACKGROUND

There exist numerous types of tablets, laptops and other portable computing devices, often having differing form factors and performance levels. For example, clamshell laptop computers are generally characterized by a lower base and an upper display portion, where the lower base provides a housing for hardware components, such as one or more processors, a motherboard, memory, a keyboard, and pointing device(s). The upper display portion typically includes a display screen assembling, and sometimes other components, such as a camera, a wireless antenna or an audio output. The lower base and upper display portion are connected with a hinge to allow for opening and closing the laptop computer.

Structurally, tablet or slate computers are generally smaller and more lightweight than laptop computers, consisting only of a single portion of a laptop computer. Tablet computers integrate the display with the typical lower base portion of a laptop computer, usually lack a physical keyboard, and often utilize a touch screen as an input device. In addition, typical tablet computers may be comprised of 7 to 10 inch displays, while the typical laptop computer display is 10 to 17 inches.

In addition to structural and operational differences, tablet and laptop computers also differ with respect to their internal software and hardware configurations. The typical laptop computer form factor houses an x86 compatible processor and is capable of running a version of Microsoft Windows. In comparison, tablet computers are most likely to run on lower powered processors and lighter weight operating systems specially designed for smaller devices. These lower powered processors are often not x86 compatible and therefore cannot run the same applications as the laptop computer. The lighter weight operating systems are often termed 'mobile operating systems' and are optimized for touch and content consumption instead of running large applications which are found on laptop computers.

In recent years, hybrid 2-in-1 computing devices have been developed that combine a laptop computer and a tablet. When attached, the tablet portion acts as a display for the laptop. A user can then detach the tablet and use it as a separate device. However, any applications being used or data being accessed on the laptop are not accessible on the tablet, and if the tablet runs a different operating system or architecture from the laptop, those applications may not be available on the tablet at all. Furthermore, once disconnected, the tablet display can no longer take advantage of the greater processing power and graphics capabilities of the laptop hardware.

DETAILED DESCRIPTION

Figure 1:
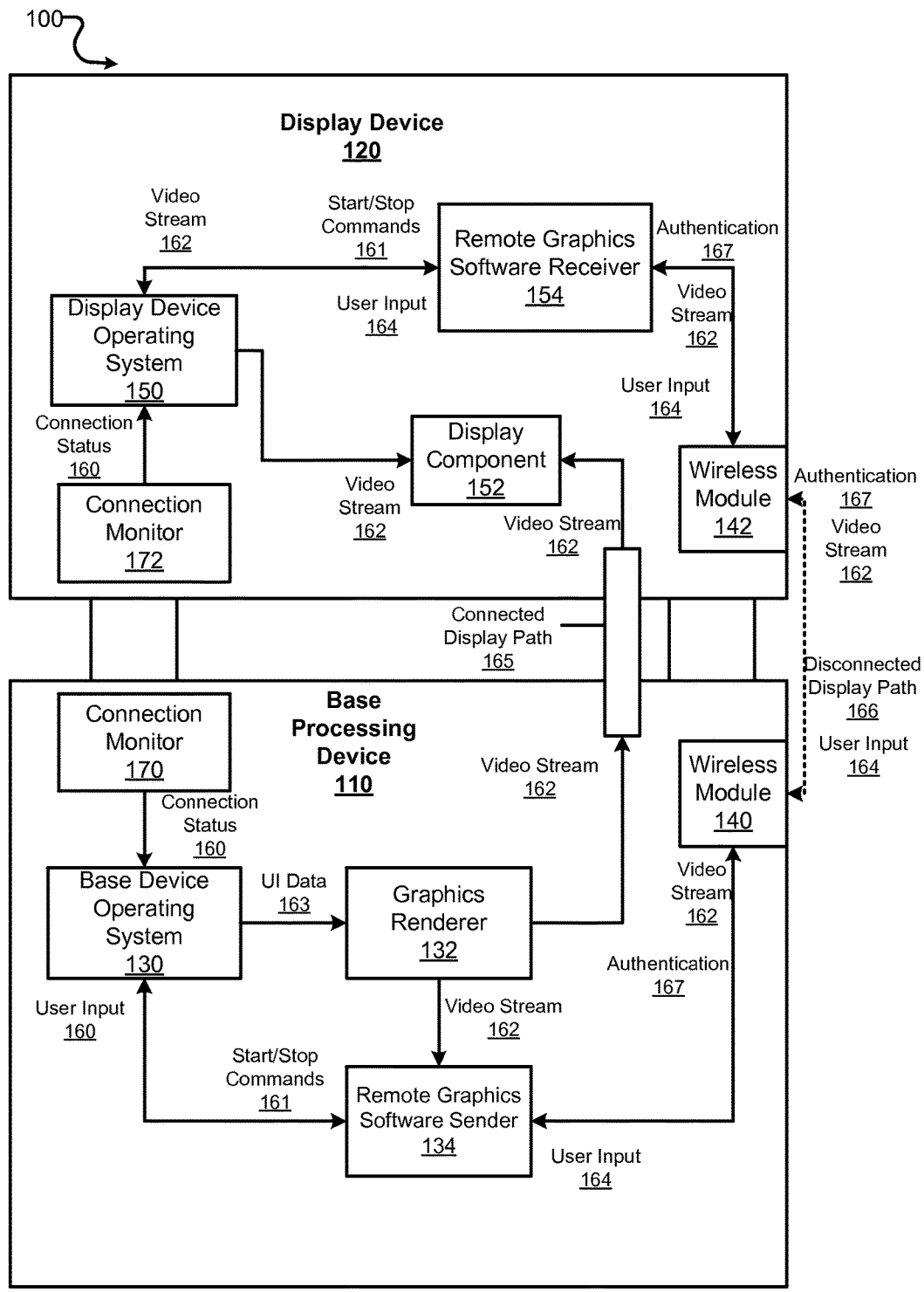
FIG. 1 illustrates an example computer system for continuously maintaining a user session when a display device is mechanically disconnected, in accordance with some aspects.

Examples described herein include a computer system that enables alternative form factor configurations or modes of operation, including separate modes of operation in which a display device is both connected and disconnected to a base processing device.

According to some examples, a computer system operates to continuously maintain a user session when the base processing device and the display device or mechanically connected and disconnected. In some examples, a computer system has an operating mode that simulates a clamshell or laptop, and an alternative tablet mode where the display device can be disconnected and moved about by the user. As described below, examples provide for the user to disconnect or otherwise detach the display device of a computer system so that the user can operate the display device as a tablet, and further to allow for the user to reattach the display device so that the computer system can be operated as a laptop and/or other form factor computing device.

In some examples, a computer system is operable to allow a user to run applications during the user session on the base processing device and use the display device as a monitor. The display device can be detached from the base processing device, and the base processing device can continue running the applications for the user session. In this mode, the disconnected or separated display device can be used as a tablet form factor computing device which can accept user input and send the user input to the base processing device. Among other functions, the base processing device can operate with the display device disconnected by generating session content for the display device, including, for example, sending application content, video streams, and other content to the display device.

When the display device is disconnected, some examples provide for the functionality of the of the display device to be limited only by the abilities of the base processing device. Thus, for example, the display device can simulate or operate as a fully functioning computer, similar in performance to the clamshell or laptop computer that can be formed in the alternative form factor configuration.

In one aspect, the base processing device runs a user session on an operating system designed for laptop or desktop use. A display device is mechanically connected to the base processing device and acts as a monitor for the base processing device in the connected configuration. In addition, a connection monitor can detect a mechanical disconnection between the display device and the base processing device (i.e., a user pulls the display device apart in order to use it as a tablet). While still maintaining the existing user session, the display device and base processing device can establish a wireless data connection between them, over which is sent video streams from the base processing device to the display device and user input from the display device to the base processing device. Upon mechanical disconnection, the base processing device can continue running the user session and rendering video to be displayed, but instead of sending the video stream over a hardwired display path, the video stream is sent over the wireless data connection for output on the display device.

Still further, examples provide for the transmission of user input associated with the user session (e.g., touch screen input on a tablet) from the display device to the base processing device. The base processing device processes the user input and updates the applications and user interfaces accordingly. For example, base processing device can render new video and transmit data corresponding to the video rendering back to the display device. In this manner, the user can control and interact with applications running on the base processing device by using the display device over a wireless data connection.

In some aspects, the computer system can determine available bandwidth over a wireless data connection and adjust the amount of data use for a user session accordingly. For example, the base processing device can output video content to the display device, but can vary the data size of the video content based on the bandwidth determination of the wireless data connection. Among other functionality, the base processing device can scale down the resolution of the video, reduce the graphical fidelity of the video content, or reduce the frequency of transmission for the video content to optimize the user experience.

In some variations, the display device can correspond to a tablet computer. Still further, the display device and the base processing device can be independent computing devices that operate on different operating systems or platforms. For example, the display device can correspond to tablet that runs a mobile-based OS such as a version of Android (manufactured by GOOGLE), and the base processing device can run a laptop or desktop-based OS such as a version of MICROSOFT WINDOWS (manufactured by the MICROSOFT CORPORATION).

According to some examples, the base processing device and the display device establish the wireless data connection using a handshake and authentication communication exchange, provided between Remote Graphics Software (RGS) running on both the base processing device and display device. This use of RGS can occur, in whole or in part, either before or after mechanical disconnection between the devices.

Under conventional approaches, when a user transitions between different computing devices (e.g., between laptop and a tablet), or between embedded systems in a single device, the user session with different applications is not maintained. For example, a user must re-open files which were in use when the transition occurred, or reestablish web pages which were open when the transition was made. Under some conventional approaches, when the user transitions between different devices, one or more files may need to be actively copied from one device to another device. In contrast to some conventional approaches, examples such as described herein enable a computing experience in which the user can transition between computing environments (e.g., clamshell or laptop environment to tablet environment) without disrupting the user session (e.g., documents or programs that were opened when the computing system was being operated in a mechanically connected (e.g., clamshell) mode remain open when the computer systems operates in the mechanically disconnected (e.g., tablet) mode). Thus, examples such as described herein maintain a continuity in the user experience as a user switches from operating a laptop or clamshell styled computer system to a tablet.

Furthermore, examples as described herein enable a user to disconnect a display device from a base processing device while maintaining continuity of user experience, and further without relying on complex synchronization mechanisms to transfer data amongst the two devices.

Among other advantages, examples such as described enable a user to disconnect a 2-in-1 device and continue using the same session on the disconnected display device (which can be operated as a tablet). Thus, the user can seamlessly transition between form factor and configuration modes of a computer system while maintaining a user session, so that the same documents, content, programs etc. remain open and accessible as the user disconnects the display device from the base processing device.

In some variations, two computing devices can operate in both a connected or integrated mode and in a disconnected or separated mode, even when each of the two devices is an independent computing device (e.g., base processing device and tablet) having different capabilities and/or different operating systems. For example, the tablet used as a display for the base processing device can have less memory, a slower processor, and reduced video capabilities compared to the base processing device itself. By using the more powerful base processing device to render content and other video over a wireless data connection, the tablet can essentially act as a dumb terminal or thin client accessing the base processing device. Then, when a user wants to reattach the devices, a reverse process can be executed to use the mechanical display path between devices with minimum disruption of the user session.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates an example computer system for continuously maintaining a user session when a display device is mechanically disconnected, in accordance with some aspects. In examples of FIG. 1, a computer system 100 includes a base processing device 110 and a display device 120. As described in greater detail, the base processing device 110 and display device 120 can be operated in multiple form factor or configuration modes, including in (i) a mechanically connected mode when the base processing device 110 and the display device 120 share a mechanical data connection, and (ii) a mechanically disconnected mode, when the base processing device 110 and the display device 120 are mechanically disconnected but utilize a wireless data connection. By way of example, the base processing device 110 and the display device 120 can be provided in a convertible 2-in-1 laptop configuration. In one example, the display device 120 can (i) act as a "tablet PC" when detached from the base processing device 110, and (ii) as a display screen for the base processing device 110 when the two devices are attached.

During base processing device 110 operation, the base processing device operating system 130 provides a computing environment, such as a desktop graphical user interface (UI), for a user. When a user logs in to the operating system, the user creates a user session with associated datasets, such as preferences, permissions, and application data. In an example of FIG. 1, the data sets of the user session can be represented by UI data 163 to create a frame buffer. Graphics renderer 132 represents a programmatic module that takes the UI data 163, generates frames of the video stream 162, and buffers the frames so that the frames are properly displayed on a monitor, screen, or similar output device. By way of example, graphics renderer 132 can be a programmable graphics pipeline implemented in software or hardware.

In the mechanically connected mode, the video stream 162 can be sent across a connected display path 165 from the base processing device 110 to a display component 152 of the display device 120. In this manner, a desktop including operating system and application content generated by processors on the base processing device 110 can be shown on a screen of the display device 120. In the mechanically disconnected mode, the connected display path 165 between devices is no longer available. Instead, the video stream 162 is communicated using a wireless data connection. In an example of FIG. 1, the video stream 162 is passed to a Remote Graphics Software (RGS) sender 134 running on the base processing device 110, which sends the video stream 162 over a disconnected display path 166 using wireless modules 140, 142.

An example of FIG. 1 recognizes that RGS is a collaboration and remote desktop solution that runs applications natively on a remote workstation (e.g., base processing device 110) in order to leverage the workstation's capabilities and resources, such as processing capabilities and/or storage resources. The desktop of the remote workstation is transmitted over a standard network to a window on a local computer (e.g., display device 120). Local keyboard, mouse, and touch inputs are supported, as well as redirection of USB devices to provide an interactive, high-performance workstation experience on a smaller, lower power device such as a tablet PC. Although aspects make reference to RGS specifically, other remote desktop solutions can be substituted for use with the computer system 100.

Connection monitors 170, 172 are part of each device and act to determine changes in the connection status 160 between the devices. In the base processing device 110, when connection monitor 170 detects that the display device 120 has been detached, it signals to the base processing device operating system 130 to enable RGS sender 134 (i.e., through start/stop commands 161). In one aspect, RGS sender 134 can run as a background process in the base processing device operating system 130 during connected operation in order to reduce the time it needs to begin operation. In another aspect, RGS sender 134 is executed only once the operating system is notified of a disconnected connection status 160. When the devices are reconnected, the operating system 130 can leave the RGS sender 134 running for a period of time or terminate it through a stop command 161.

When RGS sender 134 acquires a video stream 162, it can perform various functions on the stream. For example, a video compression feature specifically designed for digital imagery, text, and high frame rate video applications can be used to reduce the bandwidth consumption of the video stream 162. In some aspects, RGS sender 134 can detect and/or monitor the bandwidth of the wireless network or networks available and employ various methods to scale down video stream 162 accordingly for optimal performance when compression alone is not sufficient. For example, RGS sender 134 can reduce the resolution of the video stream, such as by lowering it from 1080p to 720p. Alternatively, the RGS sender 134 can reduce graphical fidelity by utilizing lossy compression algorithms. As another alternative, the RGS sender 134 can reduce the frame rate of the video stream 162 (e.g., from 60 fps to 30 fps). These implementations provide examples of performance-enhancing processes and bandwidth saving measures that can be implemented in order to further leverage the base processing device 110 for use with the display device 120. In addition, RGS sender 134 can also encrypt the video stream 162 so that a user's personal data is protected from eavesdropping over the network. Only an RGS receiver 154 with proper authentication 167 can decrypt the video stream 162 in this case.

Once it's performed any optional modifications to the video stream 162, RGS sender 134 transmits the video stream 162 to an RGS receiver 154 running on the display device 120 over a wireless network. The wireless data connection used by the RGS components is established by wireless modules 140, 142 running on their respective devices. Provided that the wireless network has sufficient bandwidth to transport video stream 162, no specific wireless technology is required. In some aspects, wireless modules 140, 142 are Wi-Fi adapters in communication with one or more wireless access points on a local area network (LAN). Video stream 162 can be sent over the LAN, or if each device is on a different LAN, over a wider area network such as the Internet. In other aspects, wireless modules 140, 142 can establish a personal area network (PAN) with Wi-Fi Direct, Bluetooth LE, or similar technologies and send the video stream 162 directly between devices without the need for other networking hardware. Wireless modules 140, 142 can also utilize cellular networks for transmission of video stream 162.

When the RGS receiver 154 receives the video stream 162, it performs any necessary decoding or decryption and then signals the display device operating system 150 to use the display component 152 to show the video stream 162 on the display device 120 screen. Thus, by utilizing RGS over a wireless network, a user can interact with the same desktop and applications running on the base processing device 110 whether the display device 120 is mechanically connected with the base processing device 110 or not. This allows graphical applications to be run remotely and displayed locally.

Methodology

Figure 2:
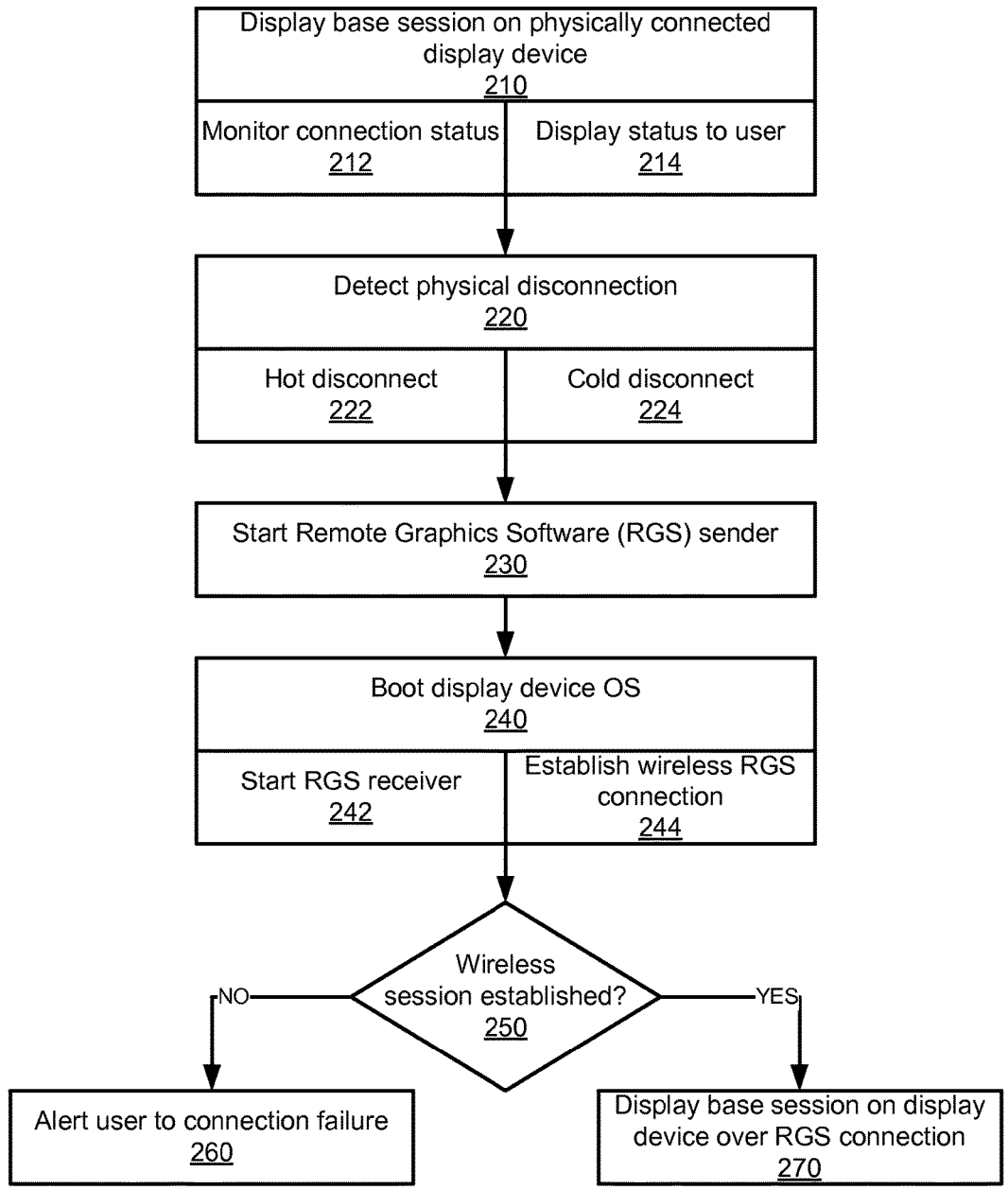
FIG. 2 illustrates an example method for continuously maintaining a user session when a display device is mechanically disconnected from a computer system, in accordance with some aspects.
Figure 3:
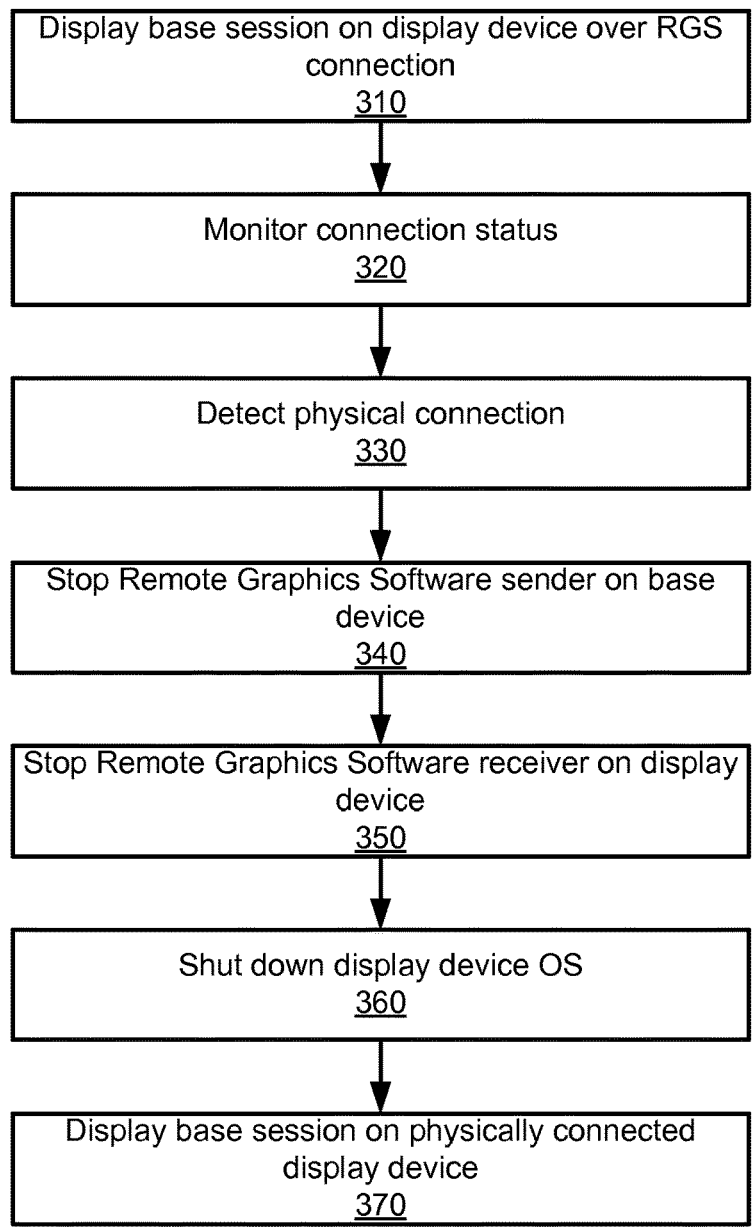
FIG. 3 illustrates an example method for continuously maintaining a user session when a display device is mechanically reconnected to a computer system, in accordance with some aspects.
Figure 4:
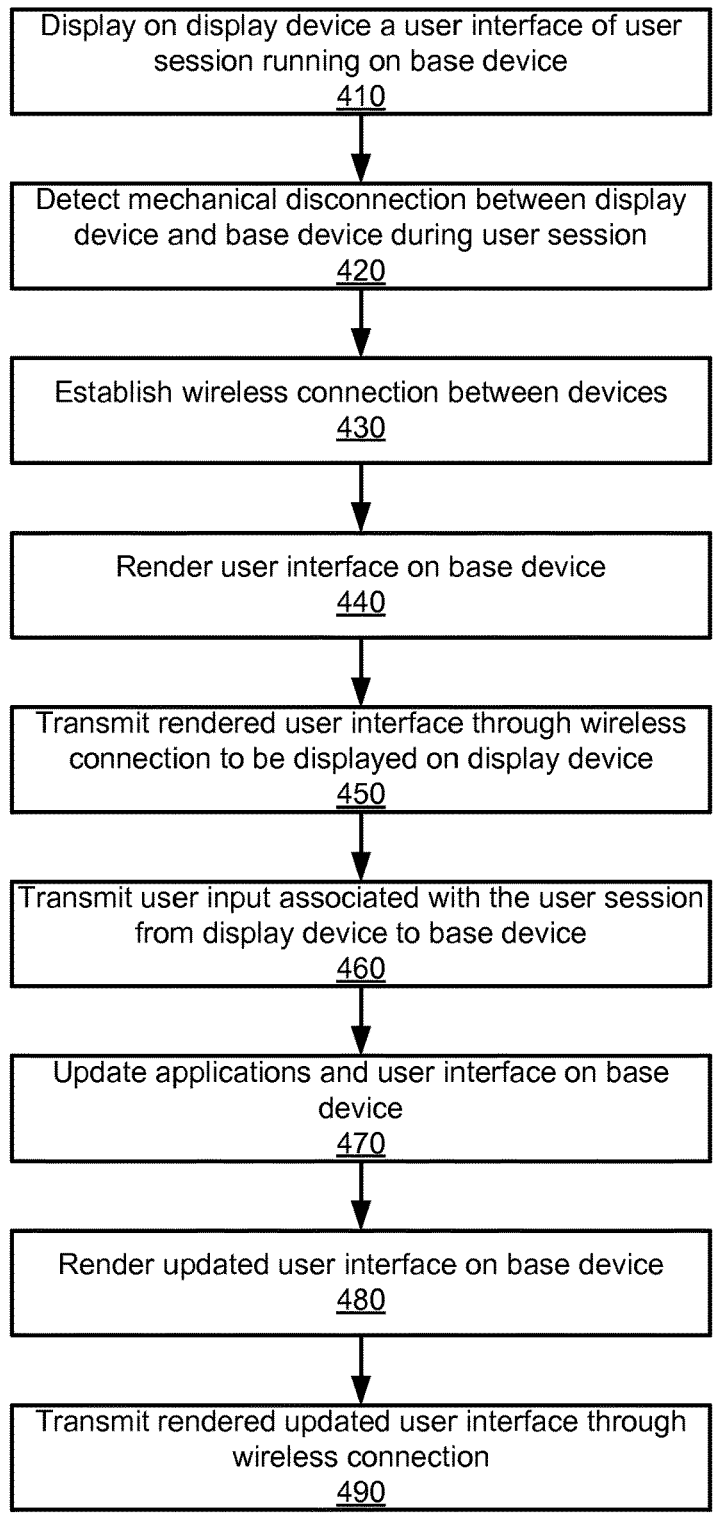
FIG. 4 illustrates an example method for seamlessly continuing a user session when a base processing device and display device of a computer system are transitioned between the mechanically connected and disconnected modes.
Figure 5:
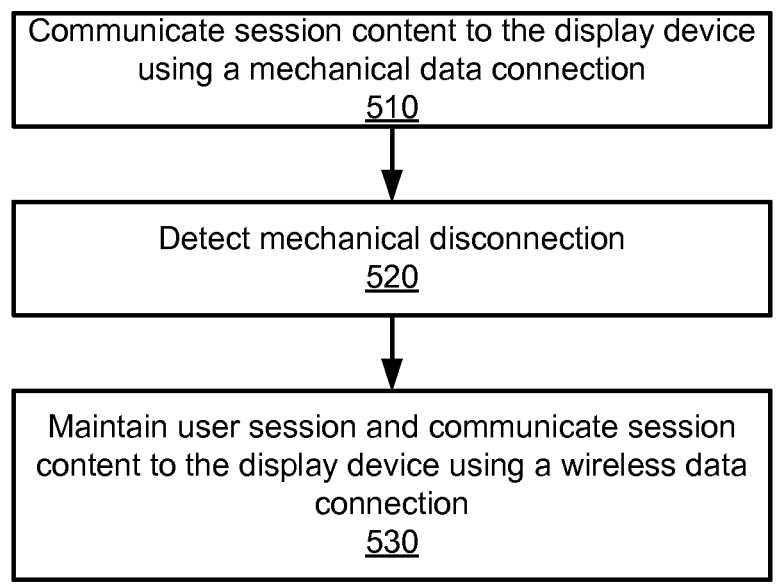
FIG. 5 illustrates an example method for continuously maintaining a user session when a display device is mechanically disconnected from a computer system, in accordance with some aspects.

FIG. 2 illustrates an example method for continuously maintaining a user session when a display device is mechanically disconnected from a computer system, in accordance with some aspects. FIG. 3 illustrates an example method for continuously maintaining a user session when a display device is mechanically reconnected to a computer system, in accordance with some aspects. FIG. 4 illustrates an example method for seamlessly continuing a user session when a base processing device and display device of a computer system are transitioned between the mechanically connected and disconnected modes. FIG. 5 illustrates an example method for continuously maintaining a user session when a display device is mechanically disconnected from a computer system, in accordance with some aspects. While some operations of example methods of FIGS. 2-5 are described below as being performed by specific components, modules or systems of the computer system 100, it will be appreciated that these operations need not necessarily be performed by the specific components identified, and could be performed by a variety of components and modules, potentially distributed over a number of machines. Accordingly, references may be made to elements of computer system 100 for the purpose of illustrating suitable components or elements for performing a step or sub step being described. Alternatively, at least certain ones of the variety of components and modules described in computer system 100 can be arranged within a single hardware, software, or firmware component. It will also be appreciated that some of the steps of example methods of FIGS. 2-5 may be performed in parallel or in a different order than illustrated.

With reference to an example of FIG. 2, a user session is displayed on the display device 120 while the base processing device 110 and the display device 120 are in a mechanically connected mode (210). When in the mechanically connected mode, the display device 120 and its peripherals may controlled by the base processing device operating system 130. Essentially, the display device 120 becomes a monitor for the base processing device 110 similar to the screen of a conventional laptop computer. As such, display device operating system 150 does not control functions of either device when the computer system 100 is in the connected state, though the display device operating system 150 can be running while the devices are connected. Furthermore, in the mechanically connected mode, UI data 163 can be generated by the base processing device operating system 130. The UI data 163 provides an example of session content or session data. The UI data 163 can be rendered and sent across a connected display path 165 to be displayed on the screen of the display device 120 acting as a monitor.

During operation, connection monitors 170, 172 on each device monitor the mechanical data connection status between the devices (212). The devices can be connected in many ways, such as through a power connection, peripheral connections, and/or a high-speed communication connection for graphics. Even if the display device operating system 150 is not running, connection monitor 172 can receive power from the base processing device 110 and run as an independent module capable of monitoring connection status 160 and signaling the display device operating system 150 in the event of a disconnect between devices.

In order to transmit the video stream 162 between devices, a wireless data connection of sufficient bandwidth may be available. This wireless data connection can be over Wi-Fi with a base station, a cellular connection such as with a 4G technology, a personal area network technology such as Wi-Fi Direct or Bluetooth LE, etc. In some aspects, the current status of the available wireless data connections that can be used by the computing system 100 is displayed to the user so the user knows whether or not disconnected operation is possible (214). This display can be software-based using a visual icon on the display screen or hardware-based using LEDs or similar indicators on either the base processing device 110 or display device 120. For example, a green LED can illuminate when a suitable Remote Graphics Software (RGS) connection is available, and a red LED can illuminate whenever one is not. The presence of a visual indication of connection status can reassure the user and avoid unpleasant surprises when the user mechanically detaches the devices.

Upon mechanical disconnection, the connection monitors 170, 172 signal the change in connection status 160 to their respective operating systems (220). When mechanical disconnection occurs, the base processing device 110 and display device 120 can be said to operate in a mechanically disconnected mode. Depending on whether the display device operating system 150 is already running or not at the time of disconnection, the method can follow either a hot or cold disconnect process.

In a hot disconnect scenario, the display device operating system 150 is already running in the background on the display device 120 during laptop mode operation (222). This scenario requires more battery power and produces extra heat as compared to the alternative cold disconnect scenario, but the hot scenario also allows for a faster transition between mechanically connected and disconnected modes. In addition, the wireless data connection between wireless modules 140, 142 can already be established, and the authentication 167 between RGS sender 134 and RGS receiver 154 can also be established beforehand.

In a cold disconnect scenario, the display device 120 acts only as a display screen for the base processing device 110 during connected operation, and the display device operating system 150 is not active (224). Therefore, the connection monitor 172 can signal the display device operating system 150 to boot and establish a wireless data connection with the base processing device 110. This scenario draws less power as compared to the hot scenario, and as such, use of the cold scenario can preserve battery life when the computer system 100 is not connected to a power outlet. However, the user session is not immediately available on the display device 120 as it would be with a hot disconnect feature. In some aspects, computer system 100 can provide the user a software function or hardware button to boot the display device operating system 150 and establish a wireless data connection while the devices are mechanically connected. In this manner, the user session can be made available quickly on disconnection without spending the battery power to keep display device 120 components active when not being used.

Upon receiving a notice of mechanical disconnection from the connection monitor 170, the base processing device operating system 130 starts the RGS sender 134 if it is not already running (230). In some aspects, RGS sender 134 can run as a background process in a low memory state during mechanically connected operation so that it starts quickly once the devices are detached.

At approximately the same time, the connection monitor 172 signals the detached connection status 160 to the display device operating system 150. If this OS is not already running on display device 120, it begins a boot process (240). Similar to the RGS sender 134 execution process, the display device operating system 150 starts RGS receiver 154 (242). In addition, wireless module 142 can connect to any preconfigured networks, such as Wi-Fi hotspots or cellular networks. In some aspects, a user can provide authentication such as a password or encryption key to connect to a wireless network and establish disconnected display path 166.

Once both RGS modules are running, the device operating systems attempt to establish a wireless RGS connection over disconnected display path 166 through wireless modules 140, 142 (244). In the presence of multiple wireless networks, RGS receiver 154 can determine which offers the highest bandwidth and best performance to use as the disconnected display path 166. For example, if display device 120 and base processing device 110 form a personal area network over Wi-Fi Direct, that connection may be preferred over a Wi-Fi connection to a LAN over TCP/IP.

In some aspects, the RGS receiver 154 and RGS sender 134 can pre-establish authentication 167 and connect seamlessly without prompting the user. In one example, the operating systems can create and exchange encryption keys while attached together and save these keys in non-volatile storage for use in RGS authentication once detached. The use of encryption keys can prevent rogue devices from connecting to the base processing device 110 and prevent display device 120 from inadvertently connecting to a different computer. Furthermore, an Internet Protocol address for wireless module 140 can be sent over a physical connection and stored along with the authentication information. In this manner, display device operating system 150 and RGS receiver 154 can find the base processing device 110 over a network without prompting the user for connection information. In other aspects, the RGS receiver 154 presents an authentication dialog for the user, which can prompt for input such as a username, password, and IP address belonging to the wireless module 140 of base processing device 110. Alternatively, the RGS receiver 154 can broadcast its presence over the LAN so that its IP address can be discovered by display device 120. In addition, the user may also need to log into the remote computer desktop session separately, for example with his or her Windows credentials.

If after multiple attempts at establishing a connection (250) fail, the user can be alerted to the connection failure (260). In one aspect, the display device operating system 150 can display its normal environment to the user, and RGS receiver 154 can generate a dialog box to explain why the connection might have failed and provide helpful diagnostic tips to the user. For example, the user can be told that the base processing device 110 could not be found or that it was found but the password entered was incorrect. Diagnostic tips can include remedial action information about the failure to help the user solve the connection problem. Until an authenticated RGS connection can be established, the display device 120 can be used as a stand-alone tablet running display device operating system 150 as if the base processing device 110 does not exist. Once the user has troubleshot any connection problems, RGS receiver 154 can attempt to reconnect to the RGS sender 134 and resume the user session running on base processing device 110.

Once the RGS connection is successful, the user session running on the base processing device 110 is displayed on the display device 120 screen over the disconnected display path 166 (270). The user can interact with input methods on the display device 120 such as a touchscreen and send user input 164 to the base processing device 110 in order to interact with and control the session similarly to operating the base processing device 110 when the computer system 100 was in the mechanically connected mode.

With reference to FIG. 3, while in the disconnected, detached mode, the user session running on the base processing device 110 is displayed on the display device 120 screen using the RGS connection (310).

Connection monitors 170, 172 monitor the physical connectors in the devices to detect when display device 120 and base processing device 110 are reattached (320). Once reattachment is detected, the connection monitors 170, 172 update the connection status 160 with each of the operating systems (330).

Once the connected display path 165 has been established, the base processing device display operating system 130 stops Remote Graphics Software (RGS) sender 134 on base processing device 120 (340), and display device operating system 150 stops RGS receiver 154 on display device (350). In some aspects, display device operating system 150 can be shut down and components other than the display component 152 of display device 120 can be turned off to reduce power consumption and save battery life. In other aspects, display device operating system 150 can remain active indefinitely or for a predetermined period of time. The display device 120 can display the user session in laptop mode as soon the connected display path 165 is available (370).

With reference to an example of FIG. 4, a user interface of a user session running on base processing device 110 is displayed on display device 120 using a mechanical data connection (410). The base processing device 110 and/or the display device 120 can detect a mechanical disconnection (420). The detection triggers the device to switch to the mechanically disconnected mode. A wireless data connection is established between devices. In some variations, the wireless data connection can be formed when mechanical disconnection is detected. Variations, the wireless data connection can be formed, or partially formed before mechanical disconnection (430). The user interface of the user session can be rendered on base processing device 110, for example by a processor and/or graphics processing unit performing graphical techniques and writing data to a frame buffer (440).

Once the mechanical disconnection has occurred and wireless data connection established, the rendered user interface is transmitted through the wireless data connection to be displayed on display device 120 (450). As the user interacts with the display device (e.g., touching a touchscreen), this user input 164 associated with the user session is transmitted from display device 120 to base processing device 110 (460). The base processing device 110 can then update applications and the user interface in response to the user input 164 (470) and render an updated user interface (480). Once rendered, the updated user interface is transmitted through the wireless data connection back to the display device 120 (490).

With reference to FIG. 5, the base processing device 110 and the display device 120 are selectively operable to communicate with each other in an mechanically connected mode using a mechanical data connection, and to communicate with each other in a mechanically disconnected mode using a wireless data connection. When in the mechanically connected mode, the base processing device 110 communicates session content to the display device 120 using the mechanical data connection (510). The devices can detect a mechanical disconnection in this mode (520). While maintaining the user session, the base processing device 110 can continue communicating the session content to the display device 120 using the wireless data connection (530).

Computer System

Figure 6:
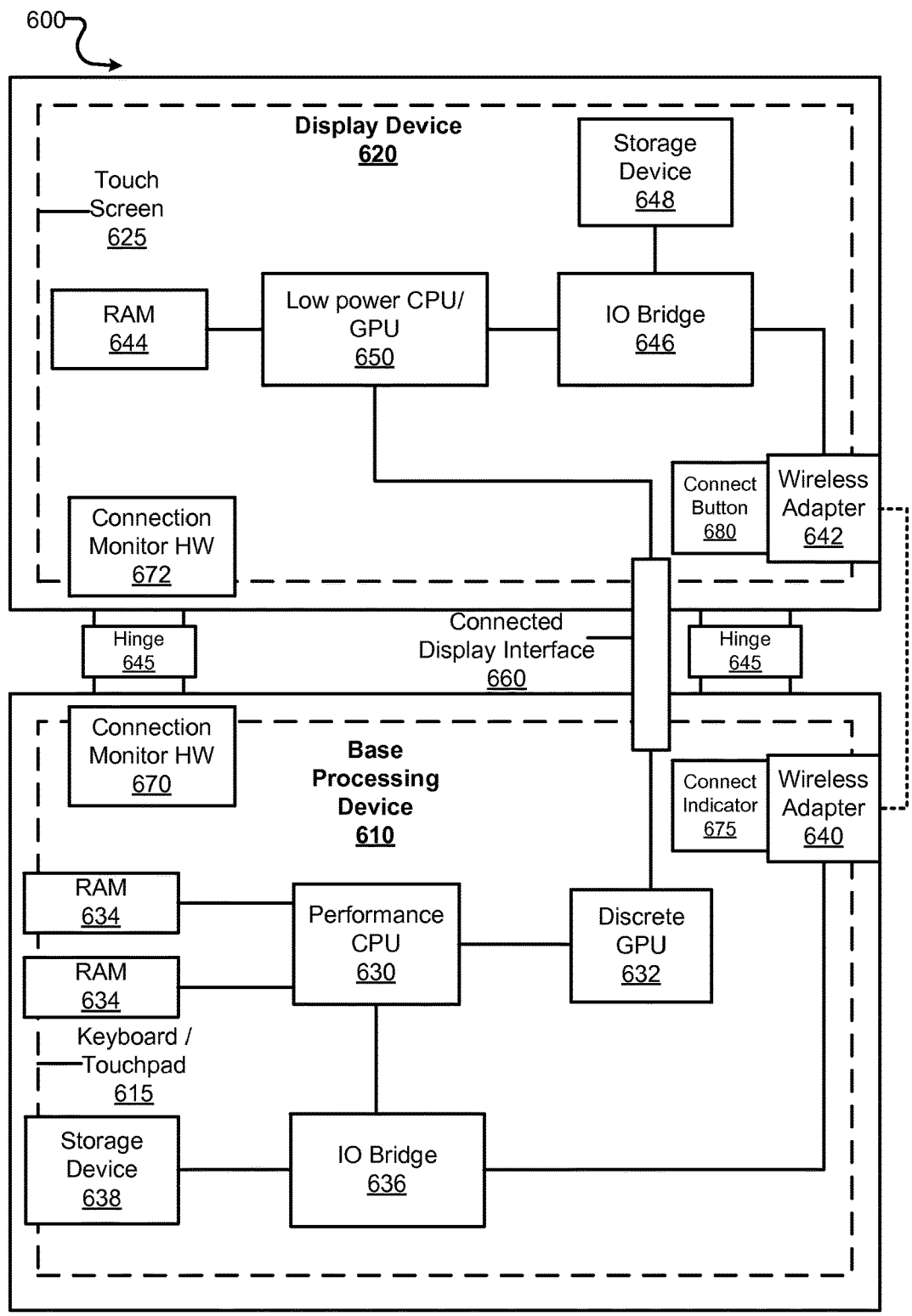
FIG. 6 is a block diagram that illustrates a hybrid computing system including a base processing device and a display device upon which aspects described herein may be implemented.

FIG. 6 is a block diagram that illustrates a hybrid computing system 600 including a base processing device 610 and a display device 620 upon which aspects described herein may be implemented. For example, in the context of FIG. 1, computer system 100 may be implemented using hardware components such as described by FIG. 6. However, as is apparent from the description herein, components of the aspects may include other features or only some of the features of the example system 600 illustrated in FIG. 6.

Tablet and laptop computers each have their own set of advantages. Advantages for tablet computers include mobility, size, weight, and increased ease of use for certain functions, such as image manipulation. While primary reasons for preferring laptop computers are increased processing power and battery life, wider choice of operating systems and applications, and the presence of a standard keyboard and touch input devices like a touchpad.

Examples provide for a hybrid computing system 600 consisting of a base processing device 610 operably connected or coupled to a detachable display device 620, wherein the detachable display device 620 includes the functionality of a tablet computing device. According to various aspects, the base processing device 610 can be comprised of the lower base of a clamshell laptop computing system, additionally having one or more interfaces (such as connected display interface 660) for connecting to the display device 620. Some aspects provide that the display device 620 is a tablet computing device with one or more complementary interfaces (such as a connector) for connecting to the base processing device 610. According to examples, the display device 620 can function as the display screen (e.g., touch screen 625) of the hybrid computing system 600 when attached to the base processing device 610 and function as an independent tablet computer when not attached to the base component. Aspects provide that the display device 620 may be connected with hinges 645 to the base processing device 610 allowing for the opening and closing of the hybrid computing system 600.

As a laptop or similar high-performance computer, base processing device 610 includes a performance CPU 630, which may contain multiple cores, have a high clock frequency, and otherwise better performance than a CPU found in a smaller device like a tablet. Base processing device 610 can also include a substantial amount of random access memory (RAM) 634, a discrete graphics processing unit (GPU) 632, and a large storage device 638 like a solid state drive (SSD). Alternatively, GPU 632 could be a high-end graphics chip embedded or attached to the performance CPU 630. For input, base processing device 610 can include a keyboard and touchpad 615 along with ports for mice, controllers, and other peripherals.

The performance CPU 630 controls the screen and any peripherals which may be located in the display device 620. The base power system (not shown) charges a battery (not shown) located in the base processing device 610 regardless of the connection state of the hybrid computer system 600. However, when the hybrid computer system 600 is in the connected state, the base power system can also charge the tablet battery via a power connection element.

In a coupled environment, there are two computing systems: a primary system (base processing device 610), and a secondary system (display device 620 taking the form of a tablet). These systems share access to various peripheral devices and/or internal components, depending on the state (connected or disconnected). Each system is capable of operating independently.

In coordinating the primary and secondary systems in terms of controlling and operating peripheral devices, one function is to ensure adequate communication between the devices. The base processing device 610 controls the display device 620, including tablet hardware, software, and peripheral devices when the hybrid computing system 600 is in the connected state. However, responsive to disconnection, display device 620 acts independently and assumes controls of internal hardware, software, and peripheral devices such that it operates as an independent tablet computing device. Once detached, the display device 620 can automatically connect wirelessly to the base processing device 610 in order to access a currently running user session on the base processing device 610 with remote desktop management software.

In some examples, display device 620 includes a low power CPU/GPU 650 and less RAM 644 than the base processing device 610. These lower specifications allow display device 620 to be lighter, cheaper, and have greater battery life than the base processing device 610. However, there is a performance trade-off in having less powerful hardware. In addition, storage device 648 in the display device 620 may only a small amount of non-volatile memory instead of an SSD. Thus, it is advantageous to make use of the higher performance components of the base processing device 610 to run applications and display them on the lower performance display device 620.

Similar between both devices are connection monitor hardware 670, 672 for detecting when the devices are mechanically connected or disconnected, IO bridges 636, 646, and wireless adapters 640, 642. Connected display interface 660 may be any suitable technology for connecting a video source to a monitor. For example, this interface can use DisplayPort, Thunderbolt, or any similar technology.

Optionally, either the base processing device 610 or display device 620 can include a connection indicator 675, which may take the form of a pair of green and red LEDs to indicate to the user whether a wireless data connection between the two devices is currently available. In addition, the display device 620 can include a connect button 680 to manually signal to the hardware to enable the wireless RGS connection. In one aspect, a user may use connect button 680 to boot the display device operating system 150 prior to mechanically detaching the devices. In this way, the system can perform a faster hot disconnect rather than a cold disconnect. In some aspects, connect button 680 may be a separate physical button or additional functionality added to a button already present on display device 620.

Examples described herein are related to the use of hybrid computing system 600 for implementing the techniques described herein. According to one embodiment, those techniques are performed by hybrid computing system 600 in response to processors 630, 650 executing one or more sequences of one or more instructions contained in main memory 634, 644. Such instructions may be read into main memory 634, 644 from another machine-readable medium, such as storage devices 638, 648. Execution of the sequences of instructions contained in main memory 634, 644 causes processors 630, 650 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A computing system comprising:
   a base processing device that executes a first operating system to generate application content for an application associated with a user session;
   a display device that executes a second operating system, the display device including a screen;
   wherein the base processing device displays the application content on the screen through a mechanical data connection when the base processing device and the display device are mechanically connected; and
   wherein the base processing device communicates the application content, using a remote desktop operation over a wireless data connection, to the second operating system to be displayed on the screen when the base processing device and the display device are mechanically disconnected.

2. The system of claim 1, further comprising:
   a connection monitor provided with the base processing device or the display device, the connection monitor to detect a mechanical disconnection between the base processing device and the display device, and
   wherein the base processing device responds to detection of the mechanical disconnection via the connection monitor by (i) automatically establishing the wireless data connection between the base processing device and the display device, and (ii) transmitting the application content to the second operating system of the display device using the wireless data connection.

3. The system of claim 2, wherein the base processing device:
   determines an available bandwidth of the wireless data connection; and
   performs, based on the available bandwidth, at least one of:
      scaling down resolution of the application content;
      reducing graphical fidelity of the application content; or
      reducing a frequency of transmission of the application content.

4. The system of claim 3, wherein:
   the base processing device includes a Remote Graphics Software (RGS) sender;
   the display device includes an RGS receiver;
   the base processing device and the display device are selectively operable to communicate using the RGS receiver and the RGS sender.

5. The system of claim 4, wherein the RGS receiver of the display device and the RGS sender of the base processing device implement a handshake and authentication communication exchange prior to the mechanical disconnection being detected between the display device and the base processing device.

6. The system of claim 4, wherein the RGS receiver of the display device and the RGS sender of the base processing device implement a handshake and authentication communication exchange in response to detecting the mechanical disconnection between the display device and the base processing device.

7. The system of claim 1, wherein the base processing device operates to:
   (i) receive, through the wireless data connection, user input that is provided through the display device and associated with the user session;
   (ii) update the application content for the user session in response to the user input; and
   (iii) transmit, through the wireless data connection, the updated application content for display on the screen of the display device.

8. The system of claim 1, wherein the base processing device generates the application content for the application associated with the user session and continuously transmits the application content to the display device using each of the mechanical data connection and the wireless data connection.

9. A method for operating a computing system comprising a base processing device and a display device, the method being implemented by a processor and comprising:
   implementing a user session with a first operating system executing on the base processing device;
   generating application content on the base processing device for an application associated with the user session;
   displaying the application content on a screen of the display device through a mechanical data connection when the base processing device and the display device are mechanically connected;
   detecting a mechanical disconnection between the base processing device and the display device;
   generating further application content for the application on the base processing device; and
   communicating the further application content, using a remote desktop operation over a wireless data connection, to a second operating system executing on the display device when the base processing device and the display device are mechanically disconnected, wherein the second operating system displays the further application content on the screen of the display device.

10. The method of claim 9, further comprising:
   responsive to detecting the mechanical disconnection, (i) automatically establishing the wireless data connection between the base processing device and the display device, and (ii) transmitting data corresponding to the further application content to the display device using the established wireless data connection.

11. The method of claim 9, further comprising:
   receiving, through the wireless data connection, user input associated with the user session from the display device;

updating the application content or the further application content responsive to the user input; and transmitting, through the wireless data connection, the updated application content to be displayed on the screen of the display device.

12. The method of claim 9, wherein generating the further application content for the display device includes determining available bandwidth of the wireless data connection and at least one of (i) scaling down resolution, (ii) reducing graphical fidelity, or (iii) reducing a frequency of transmission of the application content in accordance with the available bandwidth.

13. The method of claim 9, wherein the wireless data connection is established by a Remote Graphics Software (RGS) receiver on the display device that performs a handshake and authentication with an RGS sender on the base processing device.

14. The method of claim 13, wherein the handshake and authentication are performed prior, or in response to, detecting the mechanical disconnection between the display device and the base processing device.

15. A non-transitory computer-readable medium that stores processor-executable instructions to cause a processor to:

implement a user session with a first operating system on a base processing device that is mechanically connectable and disconnectable from a display device by a user;

generate application content on the base processing device for an application associated with the user session;

display the application content on a screen of the display device through a mechanical data connection when the base processing device and the display device are mechanically connected;

detect a mechanical disconnection between the base processing device and display device;

generate further application content for the application on the base processing device; and communicate the further application content, using a remote desktop operation over a wireless data connection, to a second operating system executing on the display device when the base processing device and the display device are mechanically disconnected, wherein the second operating system displays the further application content on the screen of the display device.

16. The non-transitory computer-readable medium of claim 15, wherein the instructions further cause, in response to detection of the mechanical disconnection, the processor to:

automatically establish the wireless data connection between the base processing device and the display device, transmit data corresponding to the further application content to the display device using the established wireless data connection.

17. The non-transitory computer-readable medium of claim 15, wherein the instructions further cause the processor to:

receive, through the wireless data connection, user input associated with the user session from the display device;

update the application content or the further application content responsive to the user input; and transmit, through the wireless data connection, the updated application content to be displayed on the screen of the display device.

18. The non-transitory computer-readable medium of claim 15, wherein the instructions to generate the further application content cause the processor to:

determine available bandwidth of the wireless data connection; and at least one of:
scale down resolution;
reduce graphical fidelity; or
reduce a frequency of transmission of the application content in accordance with the available bandwidth.

19. The non-transitory computer-readable medium of claim 15, wherein the instructions cause the processor to:

perform a handshake operation and an authentication operation between a Remote Graphics Software (RGS) receiver on the display device and an RGS sender on the base processing device.

20. The non-transitory computer-readable medium of claim 19, wherein the handshake operation and the authentication operation are performed prior, or in response to, detection of the mechanical disconnection between the display device and the base processing device.

* * * * *

UNITED STATES PATENT AND TRADEMARK OFFICE
CERTIFICATE OF CORRECTION

PATENT NO. : 10,433,362 B2  
APPLICATION NO. : 15/544722  
DATED : October 1, 2019  
INVENTOR(S) : Tom Fisher et al.

Page 1 of 1

It is certified that error appears in the above-identified patent and that said Letters Patent is hereby corrected as shown below:

On the Title Page

In Column 2, item (74), Attorney, Agent or Firm, Line 1, delete "HP Inc, Patent Dept." and insert -- HP Inc. Patent Dept. --, therefor.

On page 2, Column 2, item (56), foreign patent documents, Line 2, delete "WO-20120231522" and insert -- WO-2012023152 --, therefor.

Signed and Sealed this  
Ninth Day of June, 2020

Andrei Iancu  
*Director of the United States Patent and Trademark Office*